(12) United States Patent
Barbee

(10) Patent No.: US 7,953,689 B2
(45) Date of Patent: May 31, 2011

(54) COMBINED FEATURE CREATION TO INCREASE DATA MINING SIGNAL IN HYBRID DATASETS

(75) Inventor: Steven George Barbee, Amenia, NY (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 11/958,808

(22) Filed: Dec. 18, 2007

(65) Prior Publication Data

US 2009/0157594 A1    Jun. 18, 2009

(51) Int. Cl.
*G06F 17/00* (2006.01)
*G06N 5/02* (2006.01)

(52) U.S. Cl. .......................................................... 706/47
(58) Field of Classification Search ...................... 706/47
See application file for complete search history.

(56) References Cited

U.S. PATENT DOCUMENTS

| | | | |
|---|---|---|---|
| 6,807,519 B2 * | 10/2004 | Stanton | 703/2 |
| 6,842,889 B2 * | 1/2005 | Dulman et al. | 716/53 |
| 7,073,161 B2 * | 7/2006 | Dulman et al. | 716/53 |
| 7,086,031 B2 * | 8/2006 | Dulman et al. | 716/53 |
| 7,093,227 B2 * | 8/2006 | Dulman et al. | 716/53 |
| 7,107,572 B2 * | 9/2006 | Dulman et al. | 716/53 |
| 7,350,182 B2 * | 3/2008 | Dulman et al. | 716/53 |
| 7,401,010 B2 * | 7/2008 | Stanton | 703/2 |
| 7,546,573 B1 * | 6/2009 | Verma et al. | 716/50 |
| 7,606,409 B2 * | 10/2009 | Funakoshi | 382/141 |
| 7,728,419 B2 * | 6/2010 | Lee et al. | 257/690 |

OTHER PUBLICATIONS

Wafer fabrication scheduling using flow rate control strategy, Kager, P.; Lou, S.X.C.; Semiconductor Manufacturing Science Symposium, 1989. ISMSS 1989., IEEE/SEMI International Digital Object Identifier: 10.1109/ISMSS.1989.77237 Publication Year: 1989 , pp. 21-24.*
Increasing profitability and improving semiconductor manufacturing throughput using expert systems, Khera, D.; Cresswell, M.W.; Linholm, L.W.; Ramanathan, G.; Buzzeo, J.; Nagarajan, A.; Engineering Management, IEEE Transactions on vol. 41 , Issue: 2 Digital Object Identifier: 10.1109/17.293381 Publication Year: 1994 , pp. 143-151.*
Stochastic wafer fabrication scheduling, Youxun Shen; Leachman, R.C.; Semiconductor Manufacturing, IEEE Transactions on vol. 16 , Issue: 1 Digital Object Identifier: 10.1109/TSM.2002.807743 Publication Year: 2003 , pp. 2-14.*
Value-based dispatching for semiconductor wafer fabrication, Pierce, N.G.; Yurtsever, T.; Advanced Semiconductor Manufacturing Conference and Workshop, 2000 IEEE/SEMI Digital Object Identifier: 10.1109/ASMC.2000.902595 Publication Year: 2000 , pp. 245-249.*

* cited by examiner

*Primary Examiner* — Michael Holmes
(74) *Attorney, Agent, or Firm* — Patterson & Sheridan, LLP; James R. Nock

(57) ABSTRACT

Embodiments of the invention may be used to produce a data mining signal by generating hybrid dataset representing data related to tools used during a semiconductor fabrication process. By selectively combining similar processes, the data mining signal strength of each tool used to perform the steps of the fabrication process may be increased. A combined process variable may be used to represent the group of tools and processes, collectively. A set of rules may be composed to determine which processes used in the semiconductor fabrication process should be combined in the hybrid dataset.

18 Claims, 7 Drawing Sheets

FIG. 3A

| WAFER ID | LTH M1 | LTH M2 | LTH M3 | LTH M4 | LTH M5 | YIELD |
|---|---|---|---|---|---|---|
| 1 | A | B | A | C | B | 86 |
| 2 | B | C | A | B | A | 83 |
| 3 | C | C | B | C | A | 84 |
| 4 | C | B | C | A | B | 87 |

| WAFER | HYPOTHETICAL YIELD | ACTUAL YIELD | Δ YIELD |
|---|---|---|---|
| 1 | 91 | 86 | 5 |
| 2 | 85 | 83 | 2 |
| 3 | 87 | 84 | 3 |
| 4 | 88 | 87 | 1 |

320 / 322 / 324 / 326

| WAFER | LTH Mx TOOL A | LTH Mx TOOL B | LTH Mx TOOL C | YIELD |
|---|---|---|---|---|
| 1 | 2 | 2 | 1 | 86 |
| 2 | 2 | 2 | 1 | 83 |
| 3 | 1 | 1 | 3 | 84 |
| 4 | 1 | 2 | 2 | 87 |

FIG. 3C

COMBINED FEATURE CREATION TO INCREASE DATA MINING SIGNAL IN HYBRID DATASETS

BACKGROUND OF THE INVENTION

1. Field of the Invention

Embodiments of the invention are generally related to data mining techniques applied to analyzing semiconductor manufacturing processes and data.

2. Description of the Related Art

Typically, in semiconductor manufacturing, the overall process can include hundreds of steps, and each step involves a specific semiconductor fabrication process (e.g., lithography, etching, ion deposition, etc). Within each step, it is not uncommon for anywhere from one to tens of different tools to process a given wafer. Further, multiple tools may be used to perform different portions of a process step in parallel with one another and the same tool may touch a given wafer multiple times to perform different steps in the fabrication process. That is, each one of multiple tools may be used to perform the same step on different wafers, as well as different, but similar steps, on the same wafer.

In the manufacture of semiconductor devices, electrical properties can be affected by deviations in the fabrication process due to drifting or otherwise poorly performing processes or equipment (also referred to as tools). Therefore, techniques are needed to detect which process equipment (tool) may have caused such deviations.

SUMMARY OF THE INVENTION

Embodiments of the invention may be used to increase a data mining signal in a hybrid dataset. One embodiment of the invention includes a method of processing data collected for a semiconductor fabrication process. The method may generally include retrieving a collection of process data specifying one or more tools used to perform a sequence of semiconductor fabrication steps, specifying which of the one or more tools was used to perform each of the one or more fabrication steps, relative to one or more wafers, and further specifying a yield percentage obtained from each of the one or more wafers. The method may further include retrieving one or more rules specifying a group of semiconductor fabrication steps to combine in a hybrid dataset and transforming the collection of process data to generate the hybrid dataset. The hybrid dataset specifies a count value representing how many times each of the one or more tools performed any of the fabrication steps, relative to each of the one or more wafers. The method may further include storing the hybrid dataset for use by a data mining engine.

In a particular embodiment, the method may further include supplying the hybrid dataset to the data mining engine. The data mining engine may generally be configured to analyze the hybrid dataset to identify which, if any, of the one or more tools used during semiconductor fabrication process had a consistent negative (or positive) impact on the yield percentage obtained from each of the one or more wafers.

Another embodiment of the invention includes a computer-readable medium containing a program which, when executed on a processor, performs an operation for processing data collected for a semiconductor fabrication process. The operation may generally include, retrieving a collection of process data specifying one or more tools used to perform a sequence of semiconductor fabrication steps, and specifying which of the one or more tools was used to perform each of the one or more fabrication steps, relative to one or more wafers, and further specifying a yield percentage obtained from each of the one or more wafers. The operation may further include retrieving one or more rules specifying a group of semiconductor fabrication steps to combine in a hybrid dataset, transforming the collection of process data to generate the hybrid dataset, and storing the hybrid dataset for use by a data mining engine. The hybrid dataset specifies a count value representing how many times each of the one or more tools performed any of the fabrication steps, relative to each of the one or more wafers.

Still another embodiment of the invention includes a system having a processor and a memory containing a program configured to perform an operation for processing data collected for a semiconductor fabrication process. The program may generally be configured to retrieve a collection of process data specifying one or more tools used to perform a sequence of semiconductor fabrication steps, and specifying which of the one or more tools was used to perform each of the one or more fabrication steps, relative to one or more wafers, and further specifying a yield percentage obtained from each of the one or more wafers. The program may be further configured to retrieve one or more rules specifying a group of semiconductor fabrication steps to combine in a hybrid dataset, to transform the collection of process data to generate the hybrid dataset, and to store the hybrid dataset for use by a data mining engine. The hybrid dataset specifies a count value representing how many times each of the one or more tools performed any of the fabrication steps, relative to each of the one or more wafers,

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-3C illustrate a collection of data tables used to perform a data mining analysis using combined feature creation to increase a data mining signal in a hybrid dataset, according to one embodiment of the invention.

DETAILED DESCRIPTION OF THE PREFERRED EMBODIMENTS

Figure 1:
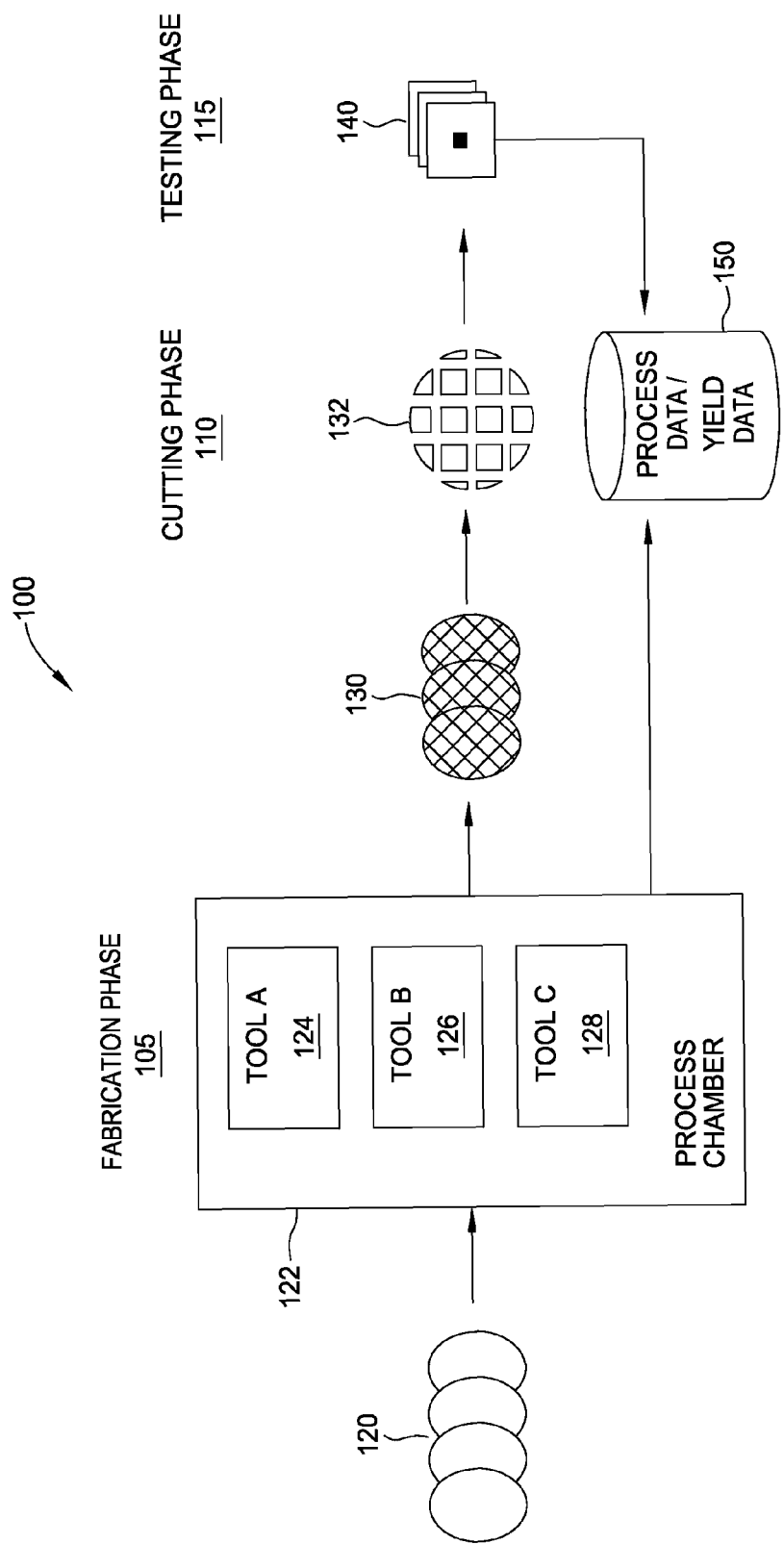
FIG. 1 is a block diagram illustrating aspects of a semiconductor fabrication process, according to one embodiment of the invention.

Data mining methods may be used to detect which process equipment (tool) may have caused such deviations. However, datasets for data mining semiconductor manufacturing logistics use either process steps or process tools as variables. That is, data mining is performed against data related to each tool used in a semiconductor fabrication process or related to each process performed during the semiconductor fabrication process. The data mining results are expressed in terms of either a process/tool(s) combination or a specific tool. If a tool is faulty, but is one of several used for a similar purpose (e.g., projection lithography at several metal levels) then its signal is diluted across the many similar process variables. If data related to just the tool is mined directly, since a faulty tool may be used at many other process steps besides metal levels, then its signal is again diluted. Thus, either approach weakens the data mining signal to the point that it is very difficult (if not impossible) to pick out of the noise, and thus may miss a tool effect that is common to several processes.

Embodiments of the invention may be used to increase a data mining signal by generating hybrid dataset representing data related to tools used during a semiconductor fabrication process. By selectively combining similar processes, a data mining signal strength of each tool used to perform the steps of the fabrication process may be increased. A combined process variable may be used to represent the group of tools and processes, collectively. A set of rules may be composed (e.g., by an expert in semiconductor processing or integration) to determine which processes used in the semiconductor fabrication process should be combined in the hybrid dataset. The strength of a data mining signal here can be described by an example. Suppose that the average yield of 100 wafers is 90%. If this were due to 90 wafers with 100% yield and 10 with 0% yield, a strong data mining signal would be one that indicated that the 10 wafers with 0% yield were all processed by one specific condition unlike the other 90 wafers. The departure of the extreme yield from the average yield here is the maximum value of (90−0=) 90 and it applies to only 10 wafers (10% of the total). It would be unlikely for a large number of wafers to all be processed by one bad tool or even a few bad tools. For instance, if 50 wafers had 100% yield and 50 wafers had 80% yield, the departure from the average yield is (90−80=) 10 is rather small, but the number of wafers to which it applies is proportionately large (50%). The strength of a data mining signal, therefore, may be understood as the degree of departure from the mean value that applies to a number of wafers. The larger the departure and/or number of wafers, the stronger the signal. The data mining signal of a tool is therefore the departure from the norm (average yield of all the wafers) for the number of wafers that were processed by that tool.

The hybrid dataset transforms data collected during the semiconductor fabrication process so that similar processes carried out using the same tools are reduced to a single variable for data mining. Doing so allows a data mining signal representing a faulty (or misconfigured) tool to become much stronger and more easily captured by a variety of data mining techniques. Further, the stronger signal may address a common objection made by a process engineering team asked to investigate a data mining result. Namely: "if the tool is bad for process A then why isn't it bad for process B?" If such similar processes are combined into a single variable, and that variable is ranked highly in the mining results, then the objection is less likely to occur. That is, by increasing the signal in a hybrid dataset, a more clear demonstration that a given tool is the cause of yield reduction may be made. Additionally, the transformed data may be mined separately from the original dataset since the possibility of a problem at a particular level, not due to a common tool among similar levels, is still possible.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 used for a semiconductor fabrication process, according to one embodiment of the invention. As shown, the semiconductor fabrication process includes a fabrication phase 105, a cutting phase 110, and a testing phase 115. Note that testing of devices in test structures built in the kerf (i.e., areas between chips), or comprising entire chip sites, can be performed at steps prior to complete fabrication of the devices. These results are usually indicative of some functionalities of the subsequently fabricated devices (chips or die). Note, however, one of ordinary skill in the art will recognize that the semiconductor fabrication process illustrated if FIG. 1 is highly simplified in order to highlight aspects of the present invention without going into unnecessary detail regarding the semiconductor fabrication process. During the fabrication phase 105, a set of semiconductor wafers 120 is supplied to a process chamber 122. Illustratively, the process chamber 122 includes three process tools. Specifically, a tool A 124, a tool B 126, and a tool C 12. For purposes of this example, assume that these tools are used to perform a sequence of lithography steps on each of the set of wafers 120. Further, assume that each of tools 124-126 may be used to perform any of the sequence of lithography steps. That is, each one of tools 124-126 may be used to perform the same lithography step on different wafers 120, as well as different, but similar lithography steps (or steps on different metal layers), on the same wafer 120.

Once each of the process steps are performed on the set of wafers 120, the wafers are out-gated from the process chamber 122 as a set of processed wafers 130. At this point in the semiconductor fabrication process, the processed wafers 130 include a collection of integrated circuits (each referred to as a die) formed by the processing steps performed by the tools 124 in the process chamber 122. Accordingly, in the cutting, or dicing, phase 110, the dies on the wafer 130 are cut, or diced, creating a collection of individual integrated circuits 132. During the testing phase 115, each integrated circuit 132 may be mounted on a test board 140 and tested to determine whether the fabrication process resulted in a functional device.

As shown, system 100 also includes a database 150 used to store process data and yield data related to wafers 120 and processed wafers 130. In one embodiment, the database 150 includes data specifying which steps of the fabrication process (e.g., which metal layer lithography step) were performed by a given tool 124-126, for each of the set of wafers 120. Additionally, database 150 may store yield data related to each wafer 120 indicating how many dies were successfully fabricated on a given wafer 120 during the semiconductor fabrication process.

Figure 2:
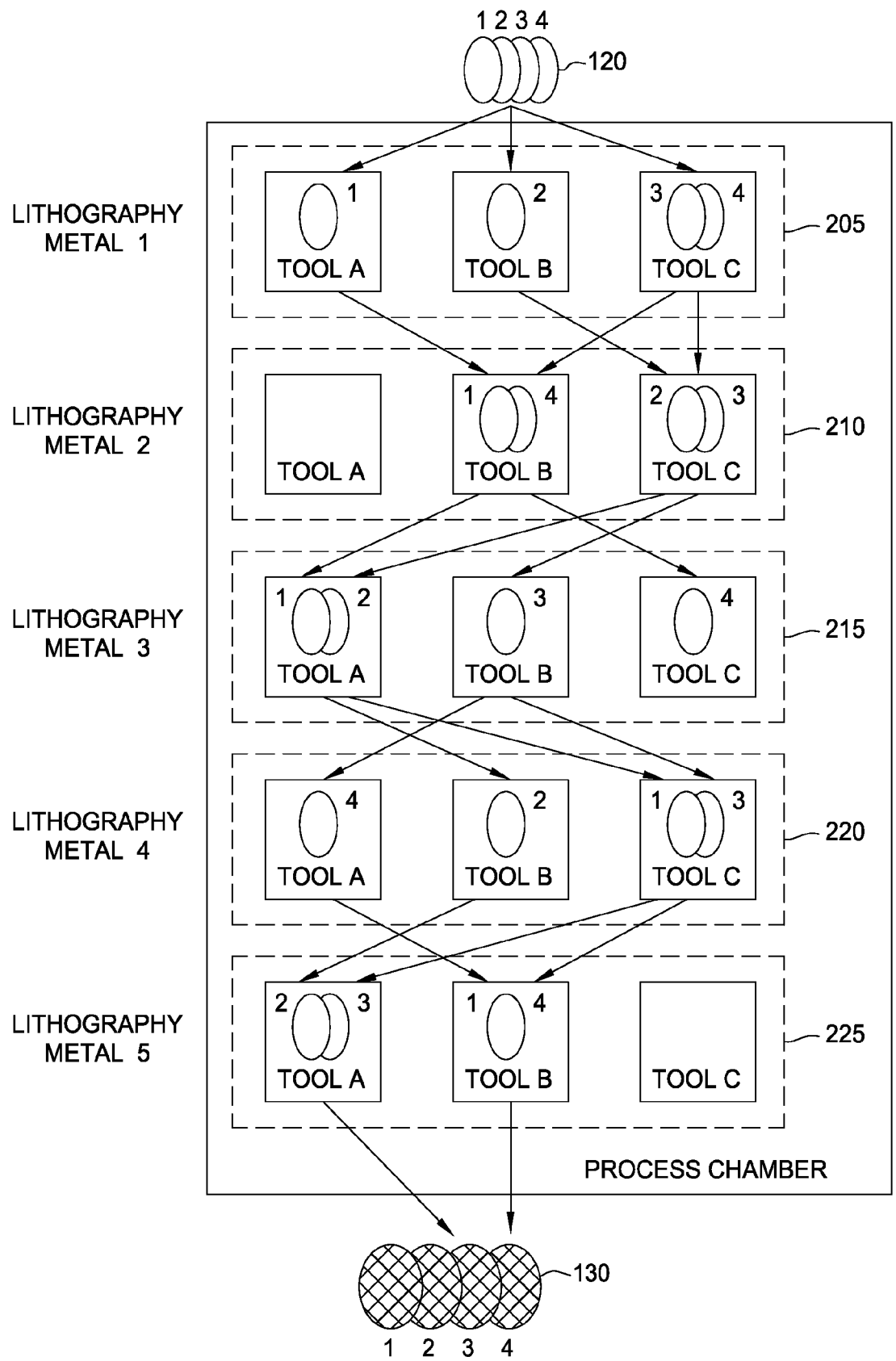
FIG. 2 is a block diagram illustrating a set of semiconductor fabrication tools used to perform a lithography processes on different metal layers, according to one embodiment of the invention.

FIG. 2 is a block diagram further illustrating the system 100 first shown in FIG. 1, according to one embodiment of the invention. More specifically, FIG. 2 illustrates an example fabrication process that includes the three fabrication tools of FIG. 1 (tool A, tool B, and tool C) used to perform a sequence of lithography steps on different metal layers of a silicon wafer. In this example, a set of four wafers 120 are in-gated to process chamber 122. In the process chamber 122, tool A, tool B, and tool C are used to sequentially perform five lithography steps 205, 210, 215, 220, and 225 on the four wafers 120. Additionally, tool A, tool B, and tool C may each be configured to perform any of the five lithography steps 205, 210, 215, 220, and 225 on a given wafer. Thus, each wafer 120 may take any one of 243 unique trajectories through process chamber 122. In this example, each wafer 120 is labeled with a wafer ID (1-4) and the arrows connecting lithography steps 205, 210, 215, 220, and 225 are used to indicate which of tool A, and tool B, and tool C were used to perform a given step on a given wafer. For example, for wafer 1, tool A performs step 205, tool B performs step 210, tool A performs step 215, tool C performs step 220, and tool B performs step 225. Similarly, the trajectories of wafers 2, 3, 4, may be tracked using the arrows connecting lithography steps 205, 210, 215, 220 and 225 and the wafer IDs listed in tool A, and tool B, and tool C at each step. Once each of the five lithography steps 205, 210, 215, 220 and 225 have been performed wafers 1, 2, 3, and 4 are out-gated (i.e., removed) from process chamber 122 as processed wafers 130.

As described above, data regarding which tool performs what fabrication steps on a given wafer may be captured and recorded in a database. FIG. 3A illustrates a collection of example data tables from such a database used to perform a data mining analysis using combined feature creation to increase a data mining signal in a hybrid dataset, according to one embodiment of the invention. Specifically, FIG. 3A includes a table 305 used to illustrate the results of the fabrication process shown in FIG. 2. As shown, table 305 includes a wafer ID column listing each of the wafer IDs 1-4. The columns labeled "LTHM1," "LTHM2," "LTHM3," "LTHM4," and "LTHM5," indicate which of the three tools performed the corresponding lithography step during the fabrication process. Thus, reading across a row of table 305 for a given wafer ID provides the trajectory of that wafer through the process chamber 122 and reading down a column indicates which of tool A, tool B, or tool C performed that lithography step on each of the different wafers.

Additionally, table 305 includes a yield column 307 specifying a percentage yield for each of the wafers. The yield column 307 indicates a percentage of functional devices cut from the corresponding wafer, relative to the total number of devices fabricated on that wafer. Additionally, the shaded cells of table 305 show how the data mining signal relative to tool A is highly diluted. For example, reading either down any column (mining by tool) or across any row (mining by wafer), tool A occurs, at most twice.

For purposes of the example illustrated in FIGS. 2-3A-C, assume that each wafer is expected to have a successful percentage yield of 85-90%. Further, assume that tool A is malfunctioning in such a way that each time tool A is used to perform one of the lithography steps, the yield for that wafer is reduced anywhere from 1-3%. FIG. 3B illustrates a table 320 shows the results of the malfunctioning tool A on the "true" yield of wafers 1-4. Illustratively, a hypothetical yield column 322 lists the yield that would have resulted for a given wafer, but the malfunctioning tool A. An actual yield column 324 stores the percentage yield obtained for the wafers 1-4 in this example, and a delta column 326 indicates how much the percentage yield of each of wafers 1-4 was reduced due to the malfunctioning tool A. Accordingly, in this example, wafer 1 is assumed to have had a potential yield of 91%, but because tool A performed two of the lithography steps, the yield percentage for wafer 1 ended up being reduced by five percent to only 86%. However, because the yield for wafer 1 would have been above the expected percentage, the reduced yield still falls within the expected range. In contrast, wafer 2 shows an actual yield of 83%, below the expected percentage, having been reduced by 2% from a hypothetical yield of 85%.

Nevertheless, because the data mining signal related to tool A is spread throughout the data in table 305, a data mining tool may not be able to "hear" this signal. That is, the data mining tool may not be able to identify the connection between being a wafer being processed by tool A and a consistent reduction in yield. Accordingly, in one embodiment, the data in the table 305 may be transformed to generate a hybrid dataset in order to increase the data mining signal of the malfunctioning tool A. For example, FIG. 3C illustrates a table 350 of an example of a hybrid dataset generated by transforming the data in table 305, according to one embodiment of the invention. As shown, table 350 includes a column combining each of the five metal lithography steps, relative to tool A, tool B, and tool C. For example, a column 355 labeled "LTHMx" (short for lithography step Metal Layer X) indicates how many times tool A performed any of the five lithography steps on each of the wafers 1-4. Table 350 also includes an "LTHMx" column indicating how many times tool B and tool C performed any of the five lithography steps for each of the wafers 1-4. Importantly, by transforming the data in table 305 to combine the metal lithography steps into a single column, the data mining signal relative to tool A, tool B, and tool C is substantially increased. That is, the connection between a consistent reduction in yield and the fact that tool A performed one or more of the lithography steps may be more easily identified by a data mining analysis of table 350. This occurs because the data mining signal relative to tool A is concentrated in column 355, rather than being spread throughout the data, as it is in table 305.

Figure 4:
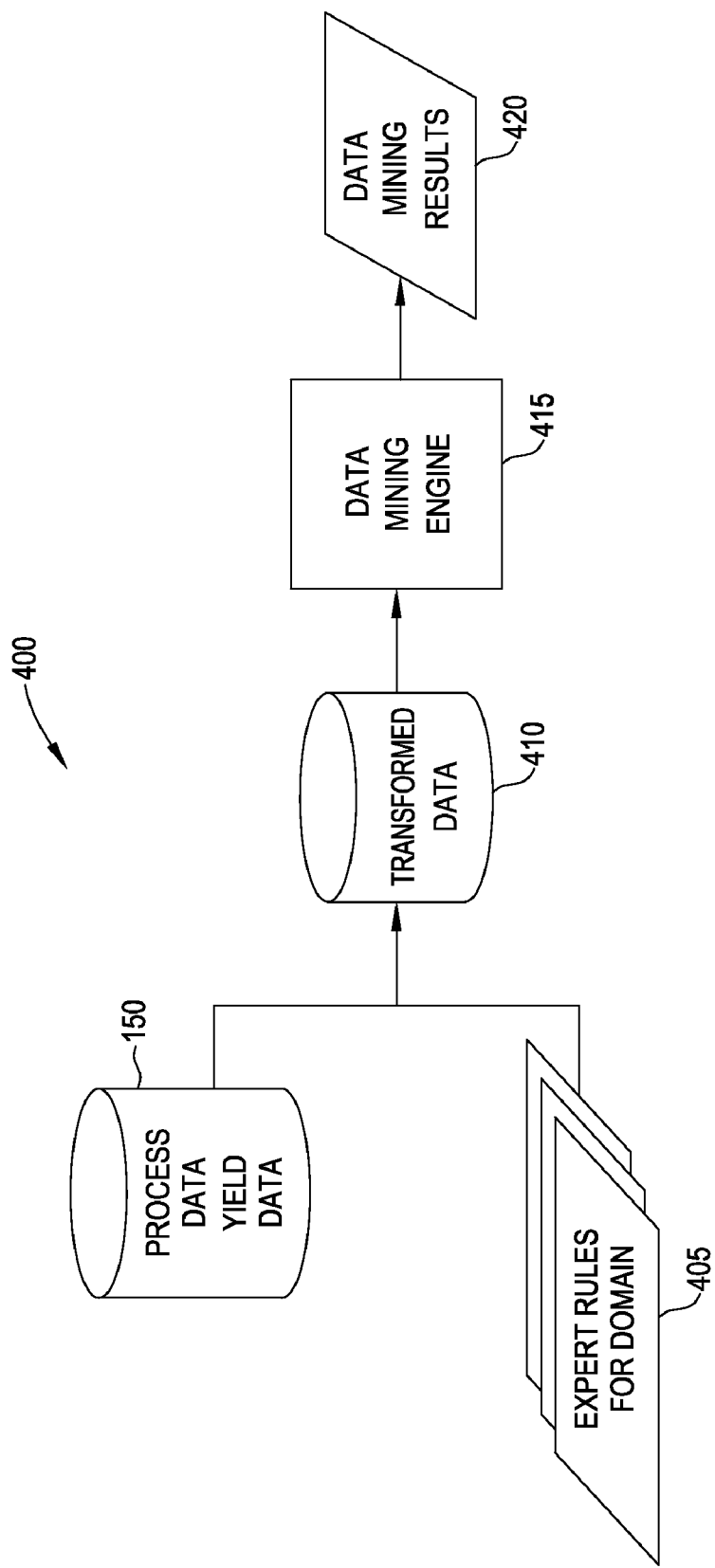
FIG. 4 illustrates elements of a data mining system used to perform a data mining analysis using combined feature creation to increase a data mining signal in a hybrid dataset, according to one embodiment of the invention.

FIG. 4 illustrates elements of a data mining system 400 used to perform a data mining analysis using combined feature creation to increase a data mining signal in a hybrid dataset, according to one embodiment of the invention. As shown, the data mining system 400 includes the database 150 used to store process data and yield data related to wafers that undergo a semiconductor fabrication process. A collection of expert rules 405 may specify how process data and yield data may be combined to form a hybrid dataset. That is, expert rules 405 may specify what process and/or tool data may be combined. For example, FIGS. 2-3 show an example of combining a number of similar metal lithography steps relative to each tool used to perform any one of those lithography steps. In one embodiment, expert rules 405 may be composed by individuals with expertise with a given aspect of the semiconductor fabrication process.

Illustratively, expert rules 405 may be used to transform data from database 150 to generate transformed data 410. For example, table 350 of FIG. 3C represents a transformed dataset generated from table 305 of FIG. 3A, according to an expert rule 405 that specifies: "when tools are used to perform multiple lithography steps on different metal layers, combine the steps into a hybrid data set." In turn, transformed data 410 may be supplied to a data mining engine 415 to produce a data mining result 420.

Data mining engine 415 may provide a software application configured to use a variety of data mining techniques to identify elements of the semiconductor fabrication process that are having a negative impact on yield percentages. Further, because the transformed dataset may increase a data mining signal of given tool, the data mining engine 415 may more readily identify (and conclusively demonstrate) that a given tool is having such a negative impact on yield percentage. Similarly, if a tool is having an unexpected positive impact on yield percentage, this data mining signal may be more readily identified as well. Identifying a tool as having an unexpected positive impact on yield percentage may allow a domain expert to analyze what about that tool may be responsible for the increased yield, leading to potential improvements that may made to other, similar tools. Examples of data mining techniques performed by the data mining engine may include regression methods such as trees (e.g., CART or CHAID), neural networks, support vector machines, or any other method that can accept categorical variables (processes or tools) as input and a continuous or numeric variable (yield) as its mining target where CART=Classification and Regression Tree and CHAID=Chi-squared Automatic Interaction Detection.

Figure 5:
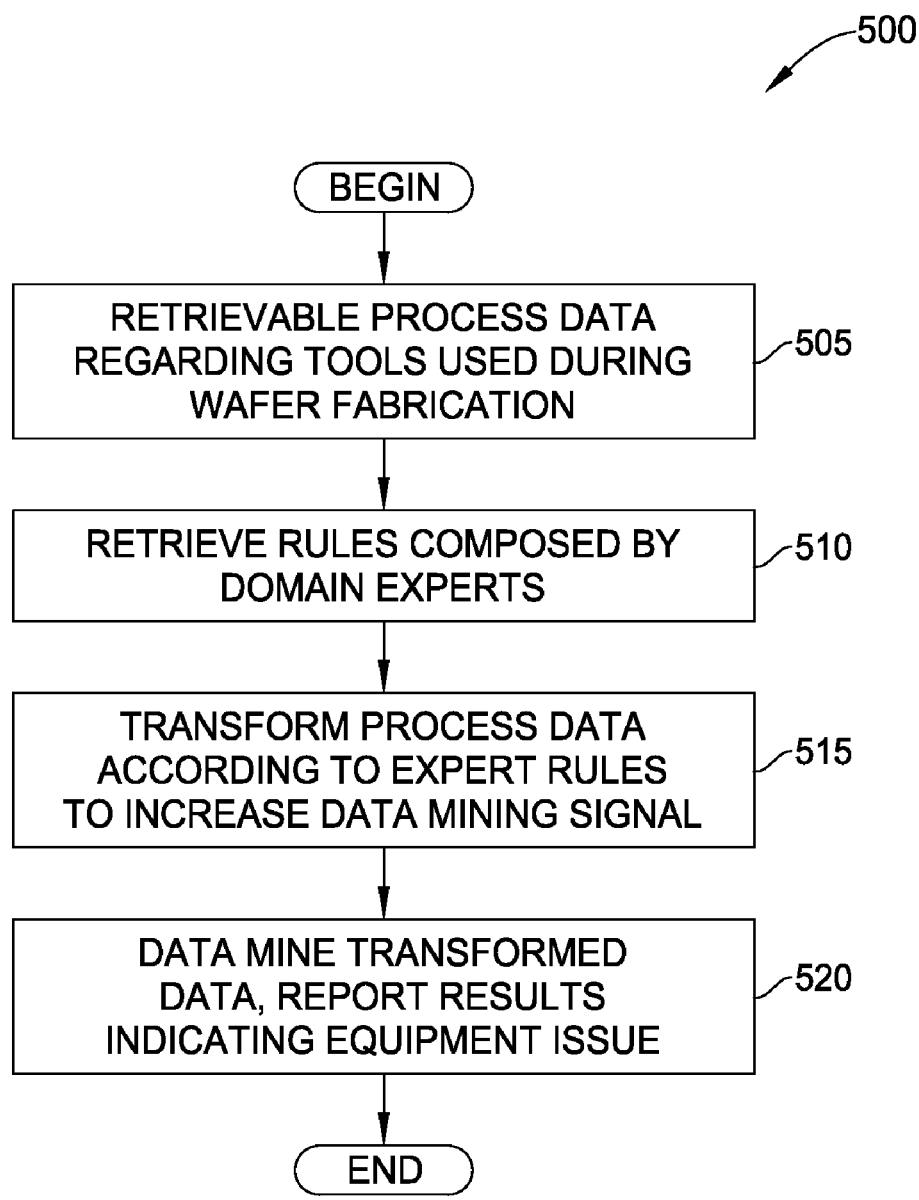
FIG. 5 illustrates a method for performing a data mining analysis of data collected during a semiconductor fabrication process, according to one embodiment of the invention.

FIG. 5 illustrates a method 500 for performing a data mining analysis of data collected during a semiconductor fabrication process, according to one embodiment of the invention. As shown, the method 500 begins at step 505 where a data mining engine retrieves process data and yield data regarding a collection of wafers undergoing a semiconductor fabrication process. For example, the data mining engine may retrieve data like the data shown in table 305 of FIG. 3A. At step 510, the data mining engine may retrieve a set of expert rules specifying how to transform the process data and yield data retrieved at step 505 in order to generate a hybrid dataset. At step 515, the data mining engine may transform the data retrieved at step 505 and the expert rules retrieved at step 510 to generate a hybrid dataset. For example, table 350 of FIG. 3C shows a hybrid dataset where the five lithography metal steps are combined relative to each of three tools. At step 520, the data mining engine may execute a data mining algorithm to analyze the transformed data set in order to identify which, if any of the tools used during the semiconductor fabrication process are having a consistent negative (or positive) impact on yield percentages. Once mined, the results of the data mining may be stored and/or provided to the appropriate individual.

Figure 6:
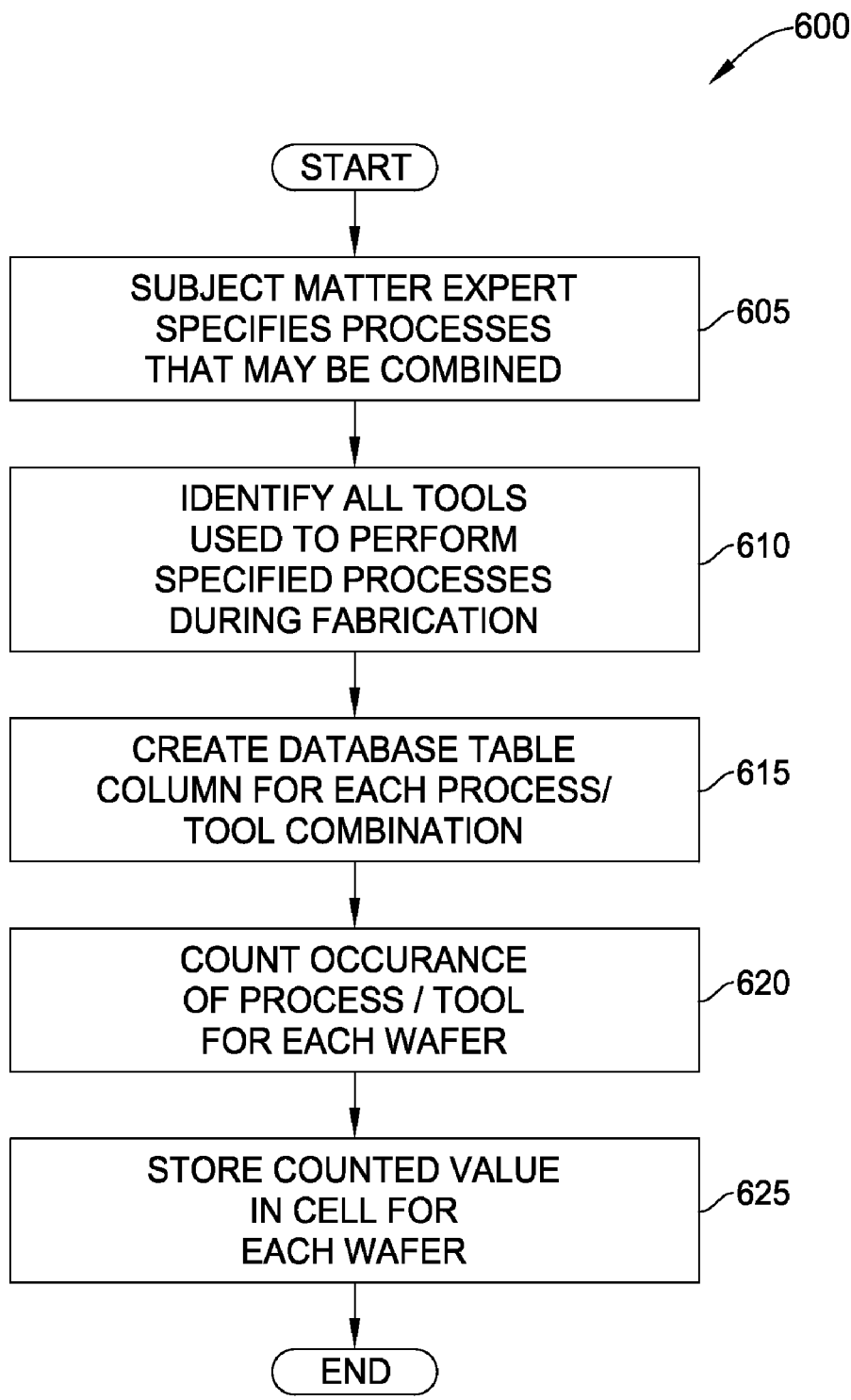
FIG. 6 illustrates a method for generating a hybrid dataset used from data collected during a semiconductor fabrication process, according to one embodiment of the invention.

FIG. 6 illustrates a method 600 for generating a hybrid dataset used from data collected during a semiconductor fabrication process, according to one embodiment of the invention. As shown, the method 600 begins at step 605 where a subject matter expert may evaluate a particular semiconductor fabrication process to evaluate features that may be combined as a hybrid dataset for data mining purposes. In one embodiment, the subject matter expert may compose one or more rules describing elements of the semiconductor fabrication process, the tools, or the process steps performed during the fabrication process that may be combined in a hybrid data set. At step 610, prior to data mining, each tool used to perform one or more of the processes specified by an expert rule composed at step 605 may be identified. At step 615, a database table may be generated that includes a column for each process/tool combination. For example, table 350 of FIG. 3C includes a column combining each of the lithography metal layer steps; for each of the three data mining tools (tool A, tool B, and tool C). At step 620, the number of times each tool represented by one of the table columns performs any of the combined process steps may be counted. In the example of FIG. 3A, the number of times tool A, tool B, and tool C performs any of the lithography metal layer steps, relative to a given wafer is counted. Once counted, at step 620, the cells of the table created at step 615 may be populated with the values determined at step 625. Once generated, the hybrid dataset generated according to method 600 may be evaluated by a data mining engine to identify which, if any of the tools used during the semiconductor fabrication process are having a consistent negative (or positive) impact on yield percentages.

Advantageously, Embodiments of the invention may be used to increase a data mining signal by generating hybrid dataset representing data related to tools used during a semiconductor fabrication process. As described herein, by selectively combining similar processes, the data mining signal strength of each tool used to perform the steps of the fabrication process is greatly increased. A combined process variable may be used to represent the group of tools and processes, collectively. An expert in semiconductor processing or integration may compose a set of rules to determine which processes used in the semiconductor fabrication process should be combined in the hybrid dataset.

Additionally, although described herein relative to a semiconductor fabrication process that includes the use of lithography steps performed for different metal layers, one of ordinary skill in the art will readily recognize that embodiments of the invention are not limited to data mining performed for this particular process used during semiconductor fabrication. For example, example embodiments of the invention may be used to create a hybrid data set relative to tools used to perform a sequence of reactive ion etching steps, a sequence of process steps for opening/closing windows on a semiconductor surface for ion implantation, a sequence of steps performed to define source and drain regions, etc. More generally, any collection of steps performed during the semiconductor fabrication process may be combined, as suggested by a subject matter expert, to create a hybrid data set with an increased data mining signal present for each tool that performs one or more of the combined process steps.

While the foregoing is directed to embodiments of the present invention, other and further embodiments of the invention may be devised without departing from the basic scope thereof, and the scope thereof is determined by the claims that follow.

What is claimed is:

1. A method of processing data collected for a semiconductor fabrication process, comprising:
    retrieving a collection of process data specifying one or more tools used to perform a sequence of semiconductor fabrication steps, and specifying which of the one or more tools was used to perform each of the one or more fabrication steps, relative to one or more wafers, and further specifying a yield percentage obtained from each of the one or more wafers;
    retrieving one or more rules specifying a group of semiconductor fabrication steps to combine in a hybrid dataset;
    transforming the collection of process data to generate the hybrid dataset, wherein the hybrid dataset specifies a count value representing how many times each of the one or more tools performed any of the fabrication steps, relative to each of the one or more wafers;
    storing the hybrid dataset for use by a data mining engine; and
    supplying the hybrid dataset to the data mining engine, wherein the data mining engine is configured to analyze the hybrid dataset to identify which, if any, of the one or more tools used during semiconductor fabrication process had a consistent negative impact on the yield percentage obtained from each of the one or more wafers.

2. The method of claim 1, further comprising, wherein the data mining engine is configured to analyze the hybrid dataset using at least one of regression methods, neural networks, support vector machines, or other data mining method that can accept categorical variables as input and a continuous or numeric variable as a mining target.

3. The method of claim 1, wherein at least one of the rules specifies to combine a series of lithography steps for different metal layers performed by the one or more tools during the semiconductor fabrication process.

4. The method of claim 1, wherein at least one of the rules specifies to combine one or more reactive ion etching, chemical vapor deposition and photolithographic steps performed by the one or more tools during the semiconductor fabrication process; to combine one or more steps for opening/closing windows on a semiconductor surface for ion implantation performed by the one or more tools during the semiconductor fabrication process; or to combine a sequence of steps to define source and drain regions performed during the semiconductor fabrication process.

5. The method of claim 1, further comprising, supplying the hybrid dataset to the data mining engine, wherein the data mining engine is configured to analyze the hybrid dataset to identify which, if any, of the one or more tools used during semiconductor fabrication process had a consistent positive impact on the yield percentage obtained from each of the one or more wafers.

6. The method of claim 1, wherein transforming the collection of process data to generate the hybrid dataset, comprises:
    identifying each of the one or more tools used to perform any of the group of semiconductor fabrication steps specified by the rule to he combined in the hybrid dataset;
    for each identified tool:
        generating a column to represent a given identified tool and each of the semiconductor fabrication steps specified by the rule to be combined in the hybrid dataset,
        counting how many times the given tool performed any of the group of semiconductor fabrication steps, relative to each of the one or more wafers, and
        storing the counted value in a cell of the column; and
    storing the columns generated for each identified tool as a database table representing the hybrid dataset.

7. A non-transitory computer-readable storage medium containing a program which, when executed on a processor, performs an operation for processing data collected for a semiconductor fabrication process, the operation comprising:
    retrieving a collection of process data specifying one or more tools used to perform a sequence of semiconductor fabrication steps, and specifying which of the one or more tools was used to perform each of the one or more fabrication steps, relative to one or more wafers, and further specifying a yield percentage obtained from each of the one or more wafers;
    retrieving one or more rules specifying a group of semiconductor fabrication steps to combine in a hybrid dataset;
    transforming the collection of process data to generate the hybrid dataset, wherein the hybrid dataset specifies a count value representing how many times each of the one or more tools performed any of the fabrication steps, relative to each of the one or more wafers and;
    storing the hybrid dataset for use by a data mining engine, wherein the operation further comprises, supplying the hybrid dataset to the data mining engine, wherein the data mining engine is configured to analyze the hybrid dataset to identify which, if any, of the one or more tools used during semiconductor fabrication process had a consistent negative impact on the yield percentage obtained from each of the one or more wafers.

8. The computer-readable medium of claim 7, wherein the data mining engine is configured to analyze the hybrid dataset using at least one of regression methods, neural networks, support vector machines, or other data mining method that can accept categorical variables as input and a continuous or numeric variable as a mining target.

9. The computer-readable medium of claim 7, wherein at least one of the rules specifies to combine a series of lithography steps for different metal layers performed by the one or more tools during the semiconductor fabrication process.

10. The computer-readable medium of claim 7, wherein at least one of the rules specifies to combine one or more reactive ion etching, chemical vapor deposition and photolithographic steps performed by the one or more tools during the semiconductor fabrication process; to combine one or more steps for opening/closing windows on a semiconductor surface for ion implantation performed by the one or more tools during the semiconductor fabrication process; or to combine a sequence of steps to define source and drain regions performed during the semiconductor fabrication process.

11. The computer-readable medium of claim 7, wherein the operation further comprises, supplying the hybrid dataset to the data mining engine, wherein the data mining engine is configured to analyze the hybrid dataset to identify which, if any, of the one or more tools used during semiconductor fabrication process had a consistent positive impact on the yield percentage obtained from each of the one or more wafers.

12. The computer-readable medium of claim 7, wherein transforming the collection of process data to generate the hybrid dataset, comprises:
   identifying each of the one or more tools used to perform any of the group of semiconductor fabrication steps specified by the rule to be combined in the hybrid dataset;
   for each identified tool:
      generating a column to represent a given identified tool and each of the semiconductor fabrication steps specified by the rule to be combined in the hybrid dataset,
      counting how many times the given tool performed any of the group of semiconductor fabrication steps, relative to each of the one or more wafers, and
      storing the counted value in a cell of the column; and
   storing the columns generated for each identified tool as a database table representing the hybrid dataset.

13. A system, comprising:
   a processor; and
   a memory containing a program configured to perform an operation for processing data collected for a semiconductor fabrication process, the program being configured to:
      retrieve a collection of process data specifying one or more tools used to perform a sequence of semiconductor fabrication steps, and specifying which of the one or more tools was used to perform each of the one or more fabrication steps, relative to one or more wafers, and further specifying a yield percentage obtained from each of the one or more wafers,
      retrieve one or more rules specifying a group of semiconductor fabrication steps to combine in a hybrid dataset,
      transform the collection of process data to generate the hybrid dataset, wherein the hybrid dataset specifies a count value representing how many times each of the one or more tools performed any of the fabrication steps, relative to each of the one or more wafers, and
      store the hybrid dataset for use by a data mining engine,
   wherein the program is further configured to supply the hybrid dataset to the data mining engine, wherein the data mining engine is configured to analyze the hybrid dataset to identify which, if any, of the one or more tools used during semiconductor fabrication process had a consistent negative impact on the yield percentage obtained from each of the one or more wafers.

14. The system of claim 13, wherein the data mining engine is configured to analyze the hybrid dataset using at least one of regression methods, neural networks, support vector machines, or other data mining method that can accept categorical variables as input and a continuous or numeric variable as a mining target.

15. The system of claim 13, wherein at least one of the rules specifies to combine a series of lithography steps for different metal layers performed by the one or more tools during the semiconductor fabrication process.

16. The system of claim 13, wherein at least one of the rules specifies to combine one or more reactive ion etching, chemical vapor deposition and photolithographic steps performed by the one or more tools during the semiconductor fabrication process; to combine one or more steps for opening/closing windows on a semiconductor surface for ion implantation performed by the one or more tools during the semiconductor fabrication process; or to combine a sequence of steps to define source and drain regions performed during the semiconductor fabrication process.

17. The system of claim 13, wherein the program is further configured to supply the hybrid dataset to the data mining engine, wherein the data mining engine is configured to analyze the hybrid dataset to identify which, if any, of the one or more tools used during semiconductor fabrication process had a consistent positive impact on the yield percentage obtained from each of the one or more wafers.

18. The system of claim 13, wherein the program is further configured to transform the collection of process data to generate the hybrid dataset by performing the steps of:
   identifying each of the one or more tools used to perform any of the group of semiconductor fabrication steps specified by the rule to be combined in the hybrid dataset; and
   for each identified tool:
      generating a column to represent a given identified tool and each of the semiconductor fabrication steps specified by the rule to be combined in the hybrid dataset,
      counting how many times the given tool performed any of the group of semiconductor fabrication steps, relative to each of the one or more wafers, and
      storing the counted value in a cell of the column; and
      storing the columns generated for each identified tool as a database table representing the hybrid dataset.

* * * * *